(12) United States Patent
Choi

(10) Patent No.: US 6,781,255 B2
(45) Date of Patent: Aug. 24, 2004

(54) SAFETY SYSTEM FOR VEHICLE POWER SLIDING DOOR

(75) Inventor: Jae-Hong Choi, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 10/642,798

(22) Filed: Aug. 18, 2003

(65) Prior Publication Data
US 2004/0036355 A1 Feb. 26, 2004

(30) Foreign Application Priority Data
Aug. 19, 2002 (KR) .................................. 10-2002-0049026

(51) Int. Cl.7 .................................................. B60L 3/00
(52) U.S. Cl. ...................................... 307/10.1; 701/43
(58) Field of Search .............................. 307/10.1–10.5; 701/49; 340/541, 540, 545.1; 180/173, 174; 49/26, 502–507

(56) References Cited

U.S. PATENT DOCUMENTS 6,137,404 A * 10/2000 O'Connor .................... 340/541
2002/0143452 A1 * 10/2002 Losey ........................ 701/49

FOREIGN PATENT DOCUMENTS

| JP | 10-058980 | 3/1998 | |
| JP | 2002-145289 | 5/2000 | |
| JP | 2000162055 A * | 6/2000 | ........... E05F/15/20 |

* cited by examiner

Primary Examiner—Gregory J. Toatley, Jr.
(74) Attorney, Agent, or Firm—Morgan Lewis & Bockius LLP

(57) ABSTRACT

A safety system for a vehicle power sliding door for restricting the operation of a sliding door via an Electronic Control Unit (ECU) when a window glass mounted at the sliding door is opened to a certain degree. The ECU receives an electric signal from a switch means once the window glass is opened to a certain degree, thus effectively reducing injury to a passenger.

6 Claims, 4 Drawing Sheets

SAFETY SYSTEM FOR VEHICLE POWER SLIDING DOOR

FIELD OF THE INVENTION

The present invention relates to a safety system for a vehicle power sliding door adapted to minimize injury to a passenger in the course of opening and closing a sliding door equipped with an ascending and descending window glass.

BACKGROUND OF THE INVENTION

Conventionally, a power sliding door is opened and closed by a simple switch manipulation, such that the sliding door may be inadvertently operated without paying attention to whether a window glass is opened or closed and whether a passenger is partially exposed outside the window glass.

Thus, there is a drawback in the conventional power sliding door in that a passenger may be severely hurt by inadvertent operation of the sliding door while part of the body of a passenger is exposed outside the vehicle through an open window.

SUMMARY OF THE INVENTION

The present invention provides a safety system for a vehicle power sliding door adapted to prevent the sliding door from automatically sliding while a window glass equipped at the sliding door is opened to a certain degree, thereby avoiding an accident involved with the power sliding door.

In accordance with an object of the present invention, there is provided a safety system for a vehicle power sliding door comprising switch means for outputting an electric signal once a window glass mounted at a sliding door is opened to a certain degree. An Electronic Control Unit (ECU) restricts the operation of the sliding door by receiving the electric signal from the switch means once the window glass is opened to a certain degree.

BRIEF DESCRIPTION OF THE DRAWINGS

For fuller understanding of the nature and objects of the present invention, reference should be made to the following detailed description taken in conjunction with the accompanying drawings in which.

DETAILED DESCRIPTION OF THE INVENTION

A safety system for a vehicle power sliding door according to the embodiment of the present invention will now be described in detail with reference to the attached drawings.

Figure 2:
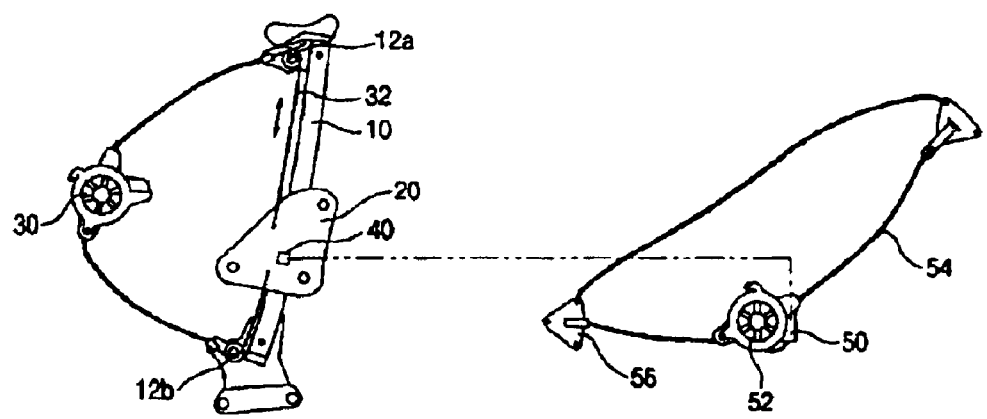
FIG. 2 is an overall constitutional view of a safety system for a power sliding door according to an embodiment of the present invention.
Figure 3:
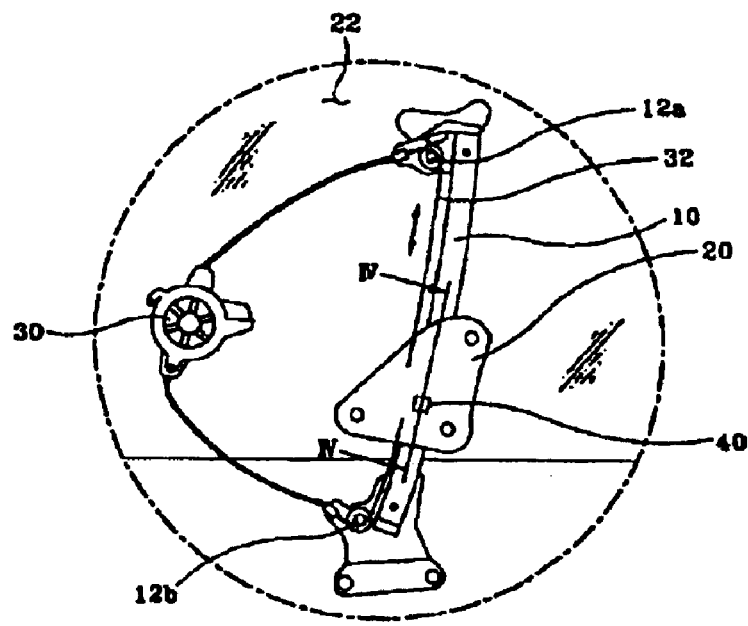
FIG. 3 is a constitutional view of a power window system of FIG. 2.

As shown in FIG. 2, a safety system for a vehicle power sliding door includes a motor (52) as a driving source of a power sliding door. A cable (54) is a power transmitting means that opens and closes the sliding door by transmitting the power from the motor (52). An ECU (50) is connected to a door switch (reference numeral 60 in FIG. 6) for restricting maneuverability of the motor (52).

Figure 1:
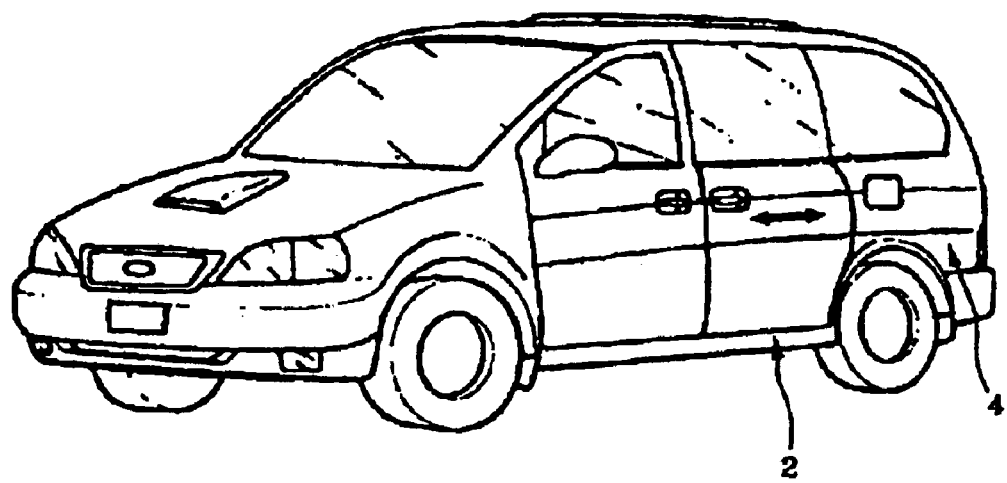
FIG. 1 is a perspective view of a vehicle mounted with a power sliding door according to the present invention.

The motor (52) installed at a rear side panel (reference numeral 4 in FIG. 1) in a vehicle either pulls or releases the cable (54) by manipulation of the door switch (60). Thereafter, the motor (52) slides the sliding door, which is coupled to one end of the cable (54) via a pulley (56), in an opening or closing direction.

A door panel (2) of the sliding door is vertically mounted with a guide rail (10). The guide rail (10) is equipped with a carrier plate (20), which is slidably installed in a vertical direction and secured with a window glass (22).

The carrier plate (20) is coupled to both ends of a wire (32), which are slidably supported by upper and lower pulleys (12a, 12b) mounted at both upper and lower ends of the guide rail (10). The wire (32) is pulled/released via a regulator (30) so as to provide a driving force of the vertical direction to the carrier plate (20) firmly connected to both ends of the wire (32).

In the embodiment of the present invention, the switch means is placed between the guide rail (10) and the carrier plate (20). A switch detector (24) is protrusively installed at one lateral side of the carrier plate (20) opposite to the guide rail (10). A contact switch (40) is installed at the guide rail (10) for detecting the switch detector (24) when the switch detector (24) passes through the contact switch (40).

The contact switch (40) is mounted with a contact part (42) for receiving a restoring force via a resilient piece (42a). The contact switch (40) is a general switch whose contact point (43) is activated or deactivated according to the position of the resilient piece (42a).

Figure 4:
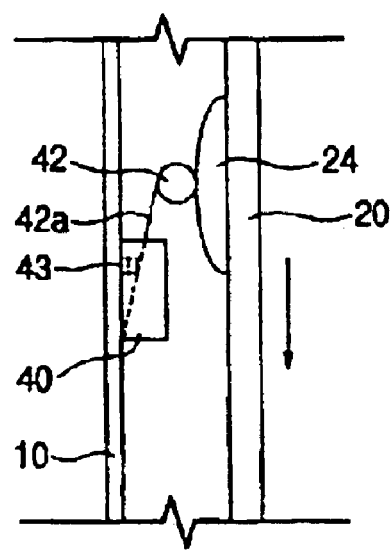
FIG. 4 is a cross-sectional view taken along line IV—IV of FIG. 3 when a contact switch is activated (ON)
Figure 5:
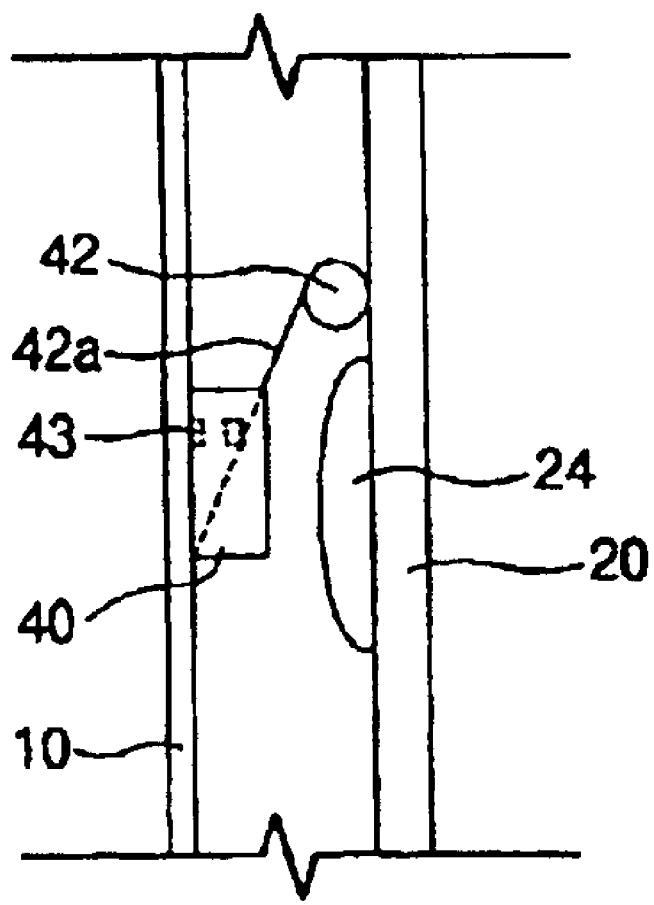
FIG. 5 illustrates a contact switch in a deactivated state (OFF) in comparison with FIG. 4.

The contact part (42) comes into a pressed state to activate the contact point (43) when the switch detector (24) of the carrier plate (20) passes therethrough. On the other hand, before or after the switch detector (24) passes through the contact part (42), the contact part (42) is released of the pressed state to deactivate the contact point (43) (see FIGS. 4 and 5).

In general, the ECU (50) installed at a power sliding door opens and closes the sliding door in response to a signal from the door switch (60). The ECU (50) according to the present invention further restricts the operation of the motor (52), which provides a driving force of the sliding door according to the signal of the switch means, notwithstanding the operation of the door switch (60) activating the sliding door.

In other words, the ECU (50) detects via an electric signal from the contact switch (40) that the window glass (22) has been opened to a certain degree (approximately 200 mm). This certain degree is an approximation of a size of a body part of a passenger that may be exposed outside the window. After the ECU (50) detects that the window glass has been opened to a certain degree, the motor (52), which functions as a driving source of the power sliding door, is restricted in operation of the sliding door despite the operation of the door switch (60).

The contact switch (40) and the switch detector (24) are respectively positioned at a particular place to activate the contact point (43) of the contact switch (40) when the window glass (22) is opened about 200 mm.

The ECU (50) discriminates that the window glass (22) is descended to be opened 200 mm or more once the contact switch (40) carries out an ON-OFF operation, thereby stopping the operation of the motor (52). Once the contact switch (40) performs another ON-OFF operation, the ECU (50) discriminates that the window glass (22) is not opened 200 mm or more to allow the motor (52) to operate normally.

Figure 6:
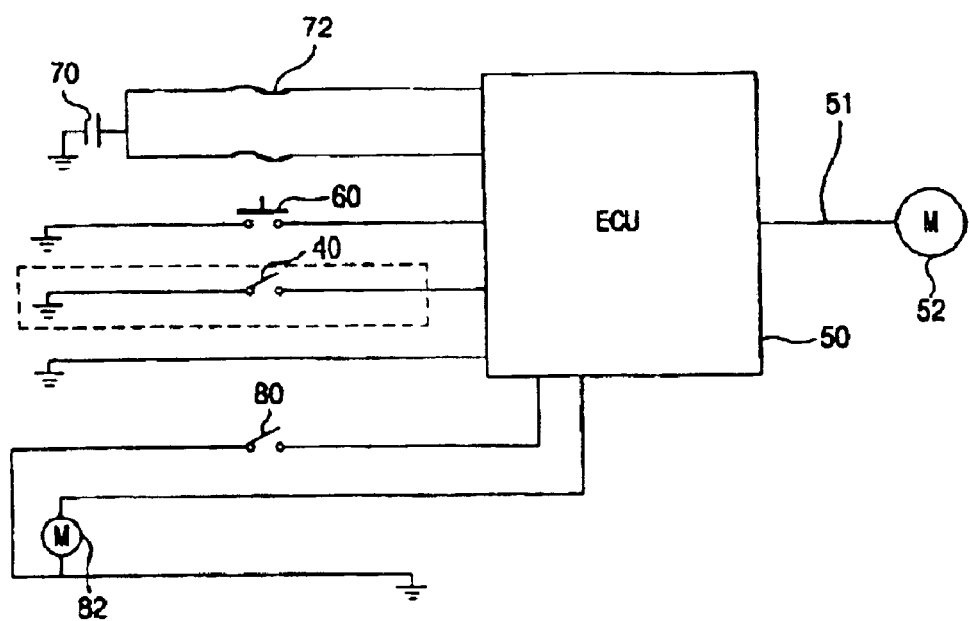
FIG. 6 is a circuit constitutional view of a safety system for a power sliding door according to the embodiment of the present invention.

FIG. 6 is a circuit constitutional view of a safety system for a power sliding door according to the embodiment of the present invention.

The ECU (50) is connected to a battery (70) via a fuse (72). The ECU (50) is also connected to a door switch (60), a contact switch (40), and a door latching switch (80) as well as a motor (52), which is a driving source of the power sliding door. The ECU (50) restricts the motor (52) via a manipulating signal or a detecting signal of each switch, and a predetermined program is inherently set up in the ECU (60) for that restriction. Unexplained numerals (51) and (82) respectively refer to a harness and a door unlatching motor.

It is not necessary for the switch means according to the present invention to have a contact structure thus described as long as the structure can detect the openness of the window glass (22) at a certain degree. Therefore, various types of switches such as an optical, an electronic switch and the like may be used. It should be apparent that the openness of the window glass is not limited to 200 mm but can be adjusted as long as the safety of a passenger is well considered.

As apparent from the foregoing, there is an advantage in the safety system for a vehicle power sliding door according to the present invention in that a power sliding door is prevented from automatic operation when a window glass is opened to a certain degree, thus effectively reducing the likelihood of an accident to the passenger.

What is claimed is:

1. A safety system for a vehicle power sliding door, comprising:
    switch means for outputting an electric signal once a window glass mounted at a sliding door is opened to a certain degree; and
    an Electronic Control Unit (ECU) for restricting the operation of said sliding door by receiving said electric signal from said switch means once said window glass is opened to a certain degree.

2. The system as defined in claim 1, wherein said switch means comprises:
    a contact switch outputting an electric signal in response to the change of contact state of a contact point; and
    a switch detector installed to operate said contact switch via ascent/descent movements of said window glass.

3. The system as defined in claim 2, wherein said contact switch is installed at a guide rail mounted in a vertical direction at said sliding door; and
    said contact detector is installed at a carrier plate, which is equipped with said window glass and slidably connected at said guide rail in the vertical direction.

4. The system as defined in claim 3, wherein said carrier plate is connected to a regulator via a wire and ascends/descends along the vertical direction of said guide rail by operation of said regulator.

5. The system as defined in claim 1, wherein said window glass is opened to a certain degree of 200 mm.

6. The system as defined in claim 1, wherein said ECU restricts the operation of said motor providing a driving force of said sliding door in response to a signal from said switch means despite the operation of a door switch that activates said sliding door.

* * * * *